United States Patent Office.

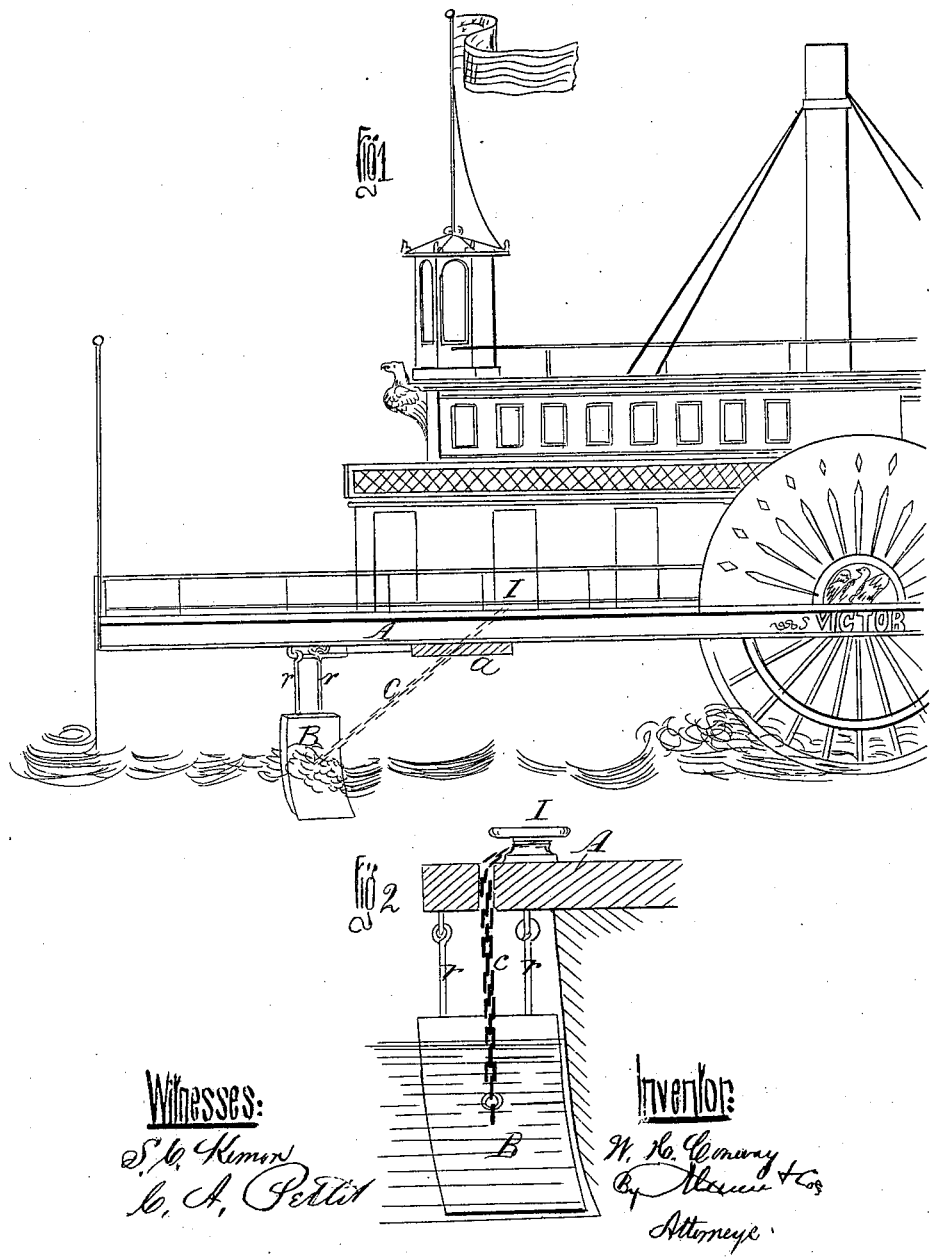

WILLIAM H. CONWAY, OF HARRISON, ASSIGNOR TO HIMSELF AND J. H. J RUTTER, OF BALTIMORE, MARYLAND.

Letters Patent No. 77,590, dated May 5, 1868.

IMPROVEMENT IN STEERING-APPARATUS.

The Schedule referred to in these Letters Patent and making part of the same.

TO ALL WHOM IT MAY CONCERN:

Be it known that I, WILLIAM H. CONWAY, of Harrison, in the county of Dorchester, and State of Maryland, have invented a new and improved Side-Rudder for Ships; and I do hereby declare the following to be a full, clear, and exact description of the same, sufficient to enable those skilled in the art to which my invention appertains to make use of it, reference being had to the accompanying drawings, forming part of this specification, in which—

Figure 1 is a perspective view.

Figure 2, a section of the guard, showing the means for operating the rudder.

This device is designed to assist a vessel in turning, and is particularly useful in backing out steamboats from their landings, enabling them to be turned in a much shorter space than when rudders at the end only are used.

It is familiar to river-men that boats land with their bows turned against the current, to enable them to come up to their places accurately and without too much headway. If they are to continue their journey up stream, they may back straight out; but if down stream, they are obliged to back out and then turn end for end, an operation which is always inconvenient, and, in narrow streams, often dangerous.

To obviate this difficulty I have invented a supplementary rudder, one of which is attached to each side of the vessel. The rudder on the starboard side is used in turning the vessel to port, and that on the port side in turning in the opposite direction.

In the drawings, A represents the guard of a steamboat, and under it, attached by hinged rods $r\ r$, are seen the supplementary rudders, B B. The rudders are firmly attached to their supporting-rods, $r\ r$, and arranged so as to act nearly across the line of the vessel's motion. The rods are so hinged that by a chain, $c$, attached towards the lower end of the rudders, and operated from the deck by a capstan, I, they may be lifted entirely out of the water, and confined securely under the guard, as shown in red lines at $a$ in fig. 1.

The rudders may be attached to the vessel before or behind the paddle-wheels, as may in any boat be most convenient. They will work to better advantage generally when attached forward of the wheels. When lowered into the water they stand erect in it, making on their rear side an angle of about forty-five degrees with the wall of the ship. When the vessel is backed, the water is thrown forward, and strikes the rudder, driving it forward until the chains stop it, and cause it to stand in the position described. The impact of the water upon the rear side of the rudder then assists in turning the vessel.

These rudders have been thoroughly tested, and it is found by practical experience that with them a vessel can be turned in a much narrower channel than with the end-rudders alone. They are simple and cheap in construction, entirely out of the way, and easily operated.

Having thus described my invention, what I claim as new, and desire to secure by Letters Patent, is—

A side-rudder for steamboats, when hinged to the under side of the guards, in such a manner that when not in use it can be drawn up out of the water, substantially as and for the purpose set forth.

To the above specification of my invention, I have signed my hand, this     day of November, 1867.

W. H. CONWAY.

Witnesses:
   CHAS. A. PETTIT,
   SOLON C. KEMON.